United States Patent [19]

Gaynor et al.

[11] 3,966,607

[45] June 29, 1976

[54] SOLID-LIQUID SEPARATOR

[75] Inventors: William Wayne Gaynor, Atwood; Gene Ray Voigt, Sterling, both of Colo.

[73] Assignee: Ceres Ecology Corporation, Denver, Colo.

[22] Filed: Jan. 22, 1975

[21] Appl. No.: 542,969

[52] U.S. Cl. .............................. 210/137; 100/117; 210/415
[51] Int. Cl.² ..................... B01D 21/04; B30B 9/12; B30B 15/00
[58] Field of Search ........... 210/152, 173, 251, 350, 210/304, 396, 414, 415, 298, 137; 100/117

[56] References Cited
UNITED STATES PATENTS

| | | | |
|---|---|---|---|
| 2,024,463 | 12/1935 | Malanowski | 210/414 |
| 3,003,412 | 10/1961 | Vincent | 100/117 |
| 3,035,511 | 5/1962 | Hayes | 100/117 |
| 3,111,082 | 11/1963 | Larsson et al. | 100/117 |
| 3,126,818 | 3/1964 | Koelsch | 100/117 X |
| 3,499,528 | 3/1970 | Salomon | 210/298 X |
| 3,585,924 | 6/1971 | Nolan | 210/415 X |
| 3,771,290 | 11/1973 | Stethem | 210/304 |
| 3,877,365 | 4/1975 | Berggren | 100/148 |

*Primary Examiner*—Theodore A. Granger
*Attorney, Agent, or Firm*—Darby & Darby

[57] ABSTRACT

Apparatus for separating a viscous slurry into solid and liquid fractions comprising a cylindrical screen and an axle extending longitudinally through said cylindrical screen with a plurality of scraper knives mounted on the axle in the upper portion of the cylindrical screen for scraping clean the interior surface of the screen. The viscous slurry is fed under pressure into the volume within the screen occupied by the scraper knives. A force is applied to a discharge valve at the bottom of the screen to provide a back pressure so that the liquid fraction can be forced through the holes of the screen while the scraper knives clean the screen. An auger flighting secured to the bottom portion of the axle compresses the solid fraction toward the discharge valve. The liquid fraction is collected externally of the screen while the solid fraction drops past the discharge valve.

The separator may be used in combination with washing apparatus comprising a horizontal trough terminating in a screw press. The trough is positioned immediately beneath the separator and includes conveyor means for moving the solid fraction as it falls from the separator beneath a set of nozzles through which fresh water is emitted to cleanse the solids prior to pressing.

7 Claims, 6 Drawing Figures

SOLID-LIQUID SEPARATOR

This invention pertains to a liquid-solid separators, and, more specifically, to a separator designed specifically to separate the solid and liquid fractions of a manure slurry of relatively low moisture content, for example, between about 70 and 80%.

Application Ser. No. 542,968 filed concurrently herewith in the names of David W. Seckler, Judson Harper and William Gaynor and entitled PROCESS FOR EXTRACTING FEED PRODUCTS FROM ANIMAL MANURE discloses and claims a process for fractionating animal manure into a silage type component of undigested fibers and grains, a high-protein feed supplement, and a soil conditioning component consisting essentially of indigestible minerals and cellulosic particles. The successful commercial operation of that process depends in part on the ability to separate a manure slurry of relatively low moisture content into a solid fraction (the silage type component) and a liquid fraction containing tthe high-protein and soil conditioning components. Reduction in the amount of water in the slurry enables the extraction of the high-protein feed supplement from the liquid fraction by evaporation which results in substantial savings that render the extraction of this high-protein feed supplement commercially feasible.

The separating apparatus of this invention is specially intended for use with a manure slurry having a moisture content as low as about 70% wherein the solid matter to be separated is suspended in a sticky mucilaginous solution not readily separable by drainage type devices such as vibrating screens or the like unless excessive amounts of water are used. Moreover, the separating apparatus of the invention is a relatively low-cost mechanism as compared to screw and other type presses ordinarily used in situations of this nature.

The principal advantage of a separator according to the invention is its capability of separating a very thick slurry into solid and liquid fractions to thereby enable economic drying of the liquid fraction. It is contemplated that the separator of this invention may be used to separate the liquids and solids of slurries other than manure slurries.

According to a further feature of the invention, the separator can be used in combination with special washing apparatus designed to wash the solid fraction as it is conveyed to a screw press. This washing apparatus also was specially designed to cleanse the fiber-grain solid fraction separated from a manure slurry but it is not necessarily so limited.

In accordance with a preferred embodiment of the invention, a viscous liquid, such as a manure slurry, is fed under substantial pressure into a cylindrical screen. The openings of the screen are sized to retain coarse solids (such as undigested fibers and grains) within the cylinder while the liquid fraction is forced through the holes. A plurality of scraper knives rotate within the screen to continuously clean the openings of the screen of solid particles. The solids are forced to the bottom of the screen by a rotating auger flighting which compresses the solids. A back pressure is maintained by a discharge member at the bottom of the screen to which a substantial force is applied, pneumatically or otherwise.

The solid fraction falls from the bottom of the separator into a washing trough which includes means for conveying the solid fraction beneath a set of nozzles to a screw press so that the solids can be washed as they are conveyed to the press.

The invention is described in detail below with reference to the annexed drawings, wherein:

FIG. 1 is a flow diagram showing the process for extracting feed products from manure for which the separator of the invention was designed;

FIGS. 2A and 2B comprise a front view, partially in section, of a separator and washing apparatus according to a preferred embodiment of the invention;

FIG. 5 is a sectional view along the line 5—5 of FIG. 4.

Figure 1:
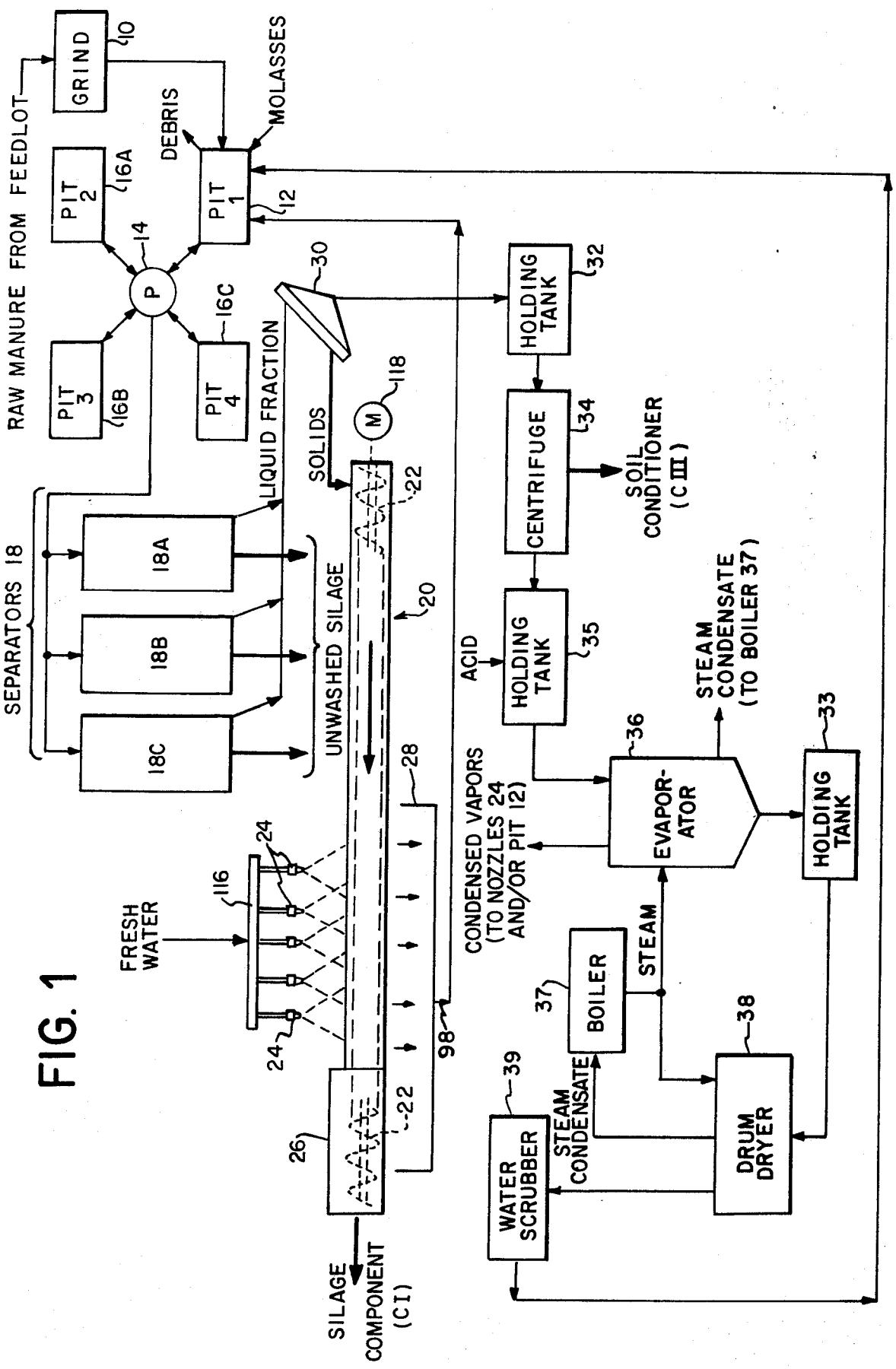
Figure 2:
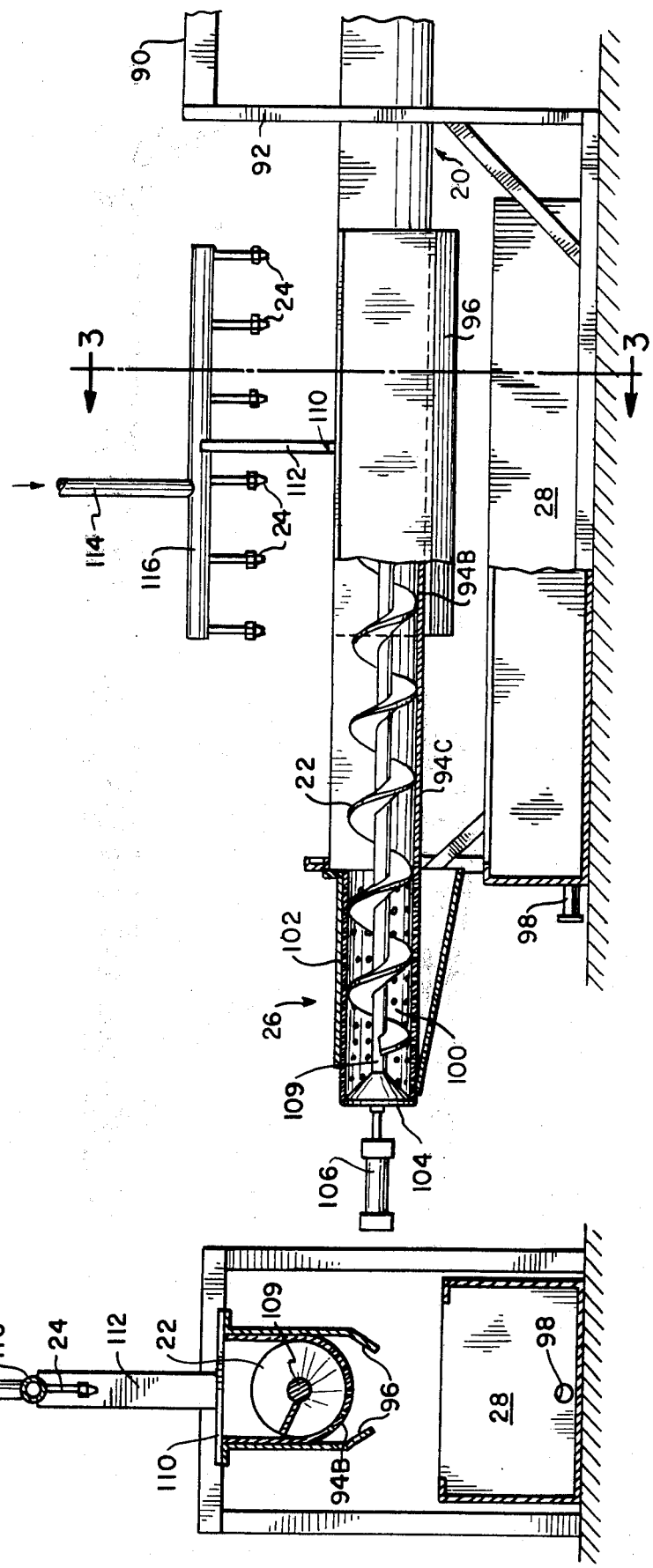

Reference will be made herein to solid and liquid fractions of the slurries although such fractions are neither entirely dry nor entirely liquid. The liquid fraction is actually a slurry of water and fine solids (primarily colloidal), and includes also most of the dissolved material. The solid fraction consists of wet solids (e.g. coarse fibers and grains). Accordingly, in the following specification and claims, the terms "liquid fraction" and "solid fraction" are to be regarded as relative terms intended to distinguish between two components of a slurry. Depending upon the particular separating process, the amount of solids contained in the liquid fraction (and vice versa) will vary. In the drawings the flow of solid fractions is shown in heavier lines than the flow of liquid fractions.

FIG. 1 shows diagrammatically the various steps of the process disclosed in the above-identified application, Ser. No. 542,968. This process is described briefly herein prior to the detailed explanation of the invention.

Referring to FIG. 1, raw manure recovered from an animal feedlot is ground by a hammer mill or other suitable device 10 and then conveyed to a first slurry pit 12 in which fermentation of the manure is started. The hammer mill 10 shreds the raw manure to divide lumps of manure into its constituent particles, without substantial grinding of the particles, and thus aids in the subsequent slurrying steps.

The slurry formed in the first pit 12 may include about 26 percent dry matter and about 24 percent water.

After about one day (to allow fermentation to start), the slurry in the first pit 12 is pumped by a standard pump 14 (with suitable valve means) to one of three operating pits 16A, 16B and 16C. Each of these operating pits should have a capacity sufficient to hold all of the manure produced in 1 day by the feedlot for which the system was designed. The operating pits 16A, B and C emptied successively so that the manure slurry will be allowed to ferment on the average for about 3½ days. This fermentation preferably results in a reduction of the pH of the manure slurry to about 4.8 with molasses.

As the contents of the first pit 12 are emptied into one of the operating pits 16, the pit 12 is filled with additional slurry for further processing through another operating pit.

When fermentation of the slurry has reached the desired point, the pump 14 feeds the fermented slurry from the selected operating pit to a liquid-solid separator 18. As shown diagrammatically in FIG. 1, separator 18 may comprise three separate separating devices 18A, 18B and 18C operating in parallel to provide the capacity required.

This invention relates primarily to these separating devices 18 which are capable of separating a manure slurry of about seventy percent water content into solid and liquid fractions.

The solid fraction from the separators 18A, B and C falls directly into a washing trough 20 arranged directly beneath the separators. Washing trough 20 includes an elongated auger 22 which propels this solid fraction from the manure slurry from right to left as viewed in the drawing beneath a set of nozzles 24 which emits a stream of clean water to cleanse the fiber and grain particles comprising the silage component. The continuous movement of auger 22 propels the cleansed wet silage component to a press 26 which reduces the moisture content of the silage component to about 60 percent (for example). This silage component is then removed from the outlet of the press by suitable conveyor means (not shown) and further processed if desired.

As shown diagrammatically in FIG. 1, a small tank 28 is arranged beneath the washing section of the trough 20 and the press 26 to receive the excess water from these portions of the system. This water, which contains substantial quantities of valuable nutrients, is recycled back to the first slurry pit 12 to bring the moisture content of the slurry within the first pit up to the desired level. In effect, a second water-manure slurry is formed in trough 20 with the liquid-solid separation occuring as the slurry is conveyed by auger 22 to press 26.

The liquid fraction from the separators 18A, 18B and 18C may be fed over a vibrating screen 30 which serves as a supplemental separator to remove some of the coarse undigested grains and fibers which may have passed through the separator 18 with the liquid fraction. These digestible solid materials fall from the vibrating screen 30 and can be fed back into the washing trough 20 by a suitable conveyor (not shown) where they are propelled by auger 22 with the solid fraction from separator 18 under the nozzles 24 and through the press 26. Thus, these solid materials from the screen 30 become part of the silage component.

The liquid fraction from the vibrating screen 30 at this point will include soluble nutrients and minerals as well as the microbial solids which constitute the digestible nutrients to be recovered and indigestible minerals and cellulosic particles (principally lignin and hemicellulose). The moisture content of the liquid fraction may be about 80%. It will appear as a viscous liquid with the nutritious microbial solids in a colloidal suspension and the indigestible minerals and cellulosic particles entrained in the liquid. This liquid fraction from vibrating screen 30 is fed to a holding tank 32 which is of sufficient size to hold the liquid fraction produced by the feedlot in one day.

The vibrating screen may be omitted, in which case the liquid fraction from the separators 18 is fed directly to holding tank 32.

The liquid fraction from holding tank 32 is fed to a low-speed centrifuge 34 which separates a substantial amount of the insoluble minerals and indigestible cellulosic fiber particles from the microbial nutrients within the liquid fraction from the separators 18 and 30. For the most part, these indigestible materials are larger and denser than the microbial nutrient particles which are primarily water. Because of this difference in density, a centrifuge can extract the denser materials. However, since some of the denser materials have nutrient value and some of the microbial particles are indigestible, separation of the indigestible materials and nutrients is not complete.

The indigestible materials removed as the centrifuge cake may be sold for use as a high quality soil conditioner. The centrifuge supernatant, which now constitutes the liquid fraction, is a viscous liquid (85% moisture, a pea-soup like consistency) including the desired nutrients partly in colloidal suspension and partly in a true solution. This viscous liquid is pumped to a holding tank 35 where about 0.5 to 1% sulfuric acid (for example) on a dry weight basis may be added to reduce the loss of nitrogen during the drying process through the formation of less volatile salts with the nitrogeneous compounds. The addition of acid further reduces the viscosity and adhesive characteristics of the liquid fraction.

Because the initial slurry has a relatively low moisture content, the protein may be extracted economically from the liquid fraction by evaporation and drying. Thus, the liquid fraction from tank 35 is fed to an evaporator 36 where, for example, the moisture content may be reduced from about 85 percent to about 70 percent.

The concentrated liquid fraction from evaporator 36 is a very viscous liquid having a consistency thicker than that of ketchup and will not pour from an open beaker. This concentrated liquid fraction may be used directly as a feed product or it may be further concentrated in a dryer 38 to provide a solid feed product. The dryer 38 may be a commercially available drum dryer comprising two rotating heated drums on which is spread the viscous liquid fraction from a holding tank 33, which receives the concentrate from evaporator 36. The drums of dryer 38 may also be heated by steam from boiler 37 with the steam condensate recycled with the steam condensate from evaporator 36 as previously described.

The dried protein forms a thin crust on the rotating drums of dryer 38 and is scraped off by suitable scraper knives as a solid flake-like material with a moisture content of about ten percent (for example).

The selection of the moisture content of the incoming manure slurry in pit 12 requires the balancing of a number of considerations. The higher the moisture content, the easier it is to extract indigestible minerals and fibers from the liquid fraction. However, as the moisture content increases so does the cost of physically extracting microbial nutrients from the liquid fraction, even if water disposal problems can be overcome. For example, by reducing moisture content from 85 percent to 70 percent, the liquid-solid ratio is reduced to from about 6 to 1 to about 2 to 1. Thus, if evaporative separating process is used to separate the water from the microbial protein (as preferred), the energy requirements are reduced by a factor of about 3.

On the other hand, at vary low moisture levels it is almost impossible to separate adequately the solid and liquid fractions; moreover, at moisture contents of less than 70 percent fermentation does not occur readily and without fermentation the amount of true protein in the solution is materially lessened. It is preferred that the moisture content be in a range between about 70 percent and 80 percent, but the invention is not limited to this range.

The reduction in moisture content of the incoming slurry is made possible by the special separating apparatus according to the preferred embodiment of the invention as shown in FIGS. 2–5 which illustrate the construction of the separator 18, the washing trough 20 and the press 26 shown diagrammatically in FIG. 1. This separating and washing apparatus has the capability of separating a manure slurry of relatively low moisture content into liquid and solid fractions thus essentially separating the silage type component from the high-protein nutrients in the wash water.

FIG. 2B shows two separators 18A and 18B arranged above the washing trough 20, shown in FIG. 2A, with the auger 22 moving the solid fraction from right to left toward the silage press 26 at the extreme left-hand side of FIG. 2A.

Separators 18A and 18B are identical and only one is described in detail. Each separator comprises a cylindrical screen 40 and a central axle 42 (FIG. 4) which is driven by a motor 44, pulley 46, and a suitable gear train 48. The portion of axle 42 which extends through the cylindrical screen 40 includes a lower auger flighting 50 and four spring-loaded scraper knives 52 (see also FIG. 5) which rotate with auger 50 when axle 42 is rotated.

The scraper knives 52 are supported on respective pairs of hollow dowels 54 (the lower ones only being illustrated in FIG. 5), each of which includes an internal coil spring 56 biased against a bifurcated pin 58 to which the corresponding scraper knife 52 is secured. The coil springs 56 urge the scraper knives 52 against the inner surface of the cylindrical screen 40.

The bottom or exit end of the screen 40 is closed by a pneumatically controlled discharge cone 60 which is secured to a vertical piston rod 62. The piston rod 62 slides within a vertical cylinder 64 so that pneumatic pressure against the piston (not shown) forces the conical surface of the cone 60 toward the lower end of the cylindrical screen 40. The cylinder 64 is mounted on a bracket 68 extending across the washing trough 20. The upper end of piston rod 62 extends above the cone 60 and includes a suitably shaped opening for receiving a projection 70 from the lower end of axle 42 for rotatably supporting the axle. The opposite or upper end of axle 42 may be supported within a truss bearing 72 or the like to enable free rotation of the axle.

The separator construction as described may be mounted in any desired way. As shown most clearly in FIG. 4, upper and lower circular plates 76 and 78 are provided with four vertical struts 80 (see FIG. 5) providing mechanical support. Four vertical angle irons 82, L-shaped in cross section, extend between the plates 76 and 78 to provide further mechanical support for the screen 41 against which substantial pressure is applied by the manure slurry during the separating process. An external ring 84 centrally located provides further support for the screen 41.

The inlet for the manure is provided by a horizontal high pressure pipe 84 which introduces the slurry tangentially at the top of the screen 41. The lower plate 78 includes an upwardly extending collar 86 in which the liquid fraction collects prior to outlet through pipe 88 and a common channel 89.

The separators 18 are supported on horizontal channel bars 90 of a frame further including four upstanding vertical posts 92 suitably secured to ground. The washing trough 20 beneath the separators 18 includes three sections 94A, 94B and 94C (see FIGS. 2A and 2B).

Section 94A of the casing is imperforate and is immediately beneath the separators 18A, 18B and 18C. The next section 94B beneath the nozzles 24 includes a perforated screen through which wash water from the nozzles 24 can fall into tank 28. The third section 94C is also imperforate and serves to guide the washed silage component into the press 26.

A pair of formed plates 96 (FIG. 3) extend downwardly from opposite sides of the casing section 94B to guide the liquid fraction or wash water into the tank 28. Tank 28 includes an outlet pipe 98 through which the liquid fraction is fed to the vibrating screen 30 of FIG. 1.

The press 26 includes a perforated screen 100 extending longitudinally from the open end of the last trough section 94C. Screen 100 may be mechanically supported on its sides and top by a funnel-like member 102 partially enveloping the screen and also serving to direct liquid pressed through screen 100 into tank 28. The outer end of the perforated screen 100 is enclosed by a closure cone 104 urged pneumatically against the end of the screen 100. The auger may be driven by conventional means such as a motor 118, pulley 120 and gear train 122 shown mounted at the right-hand end of trough 20.

Figure 3:
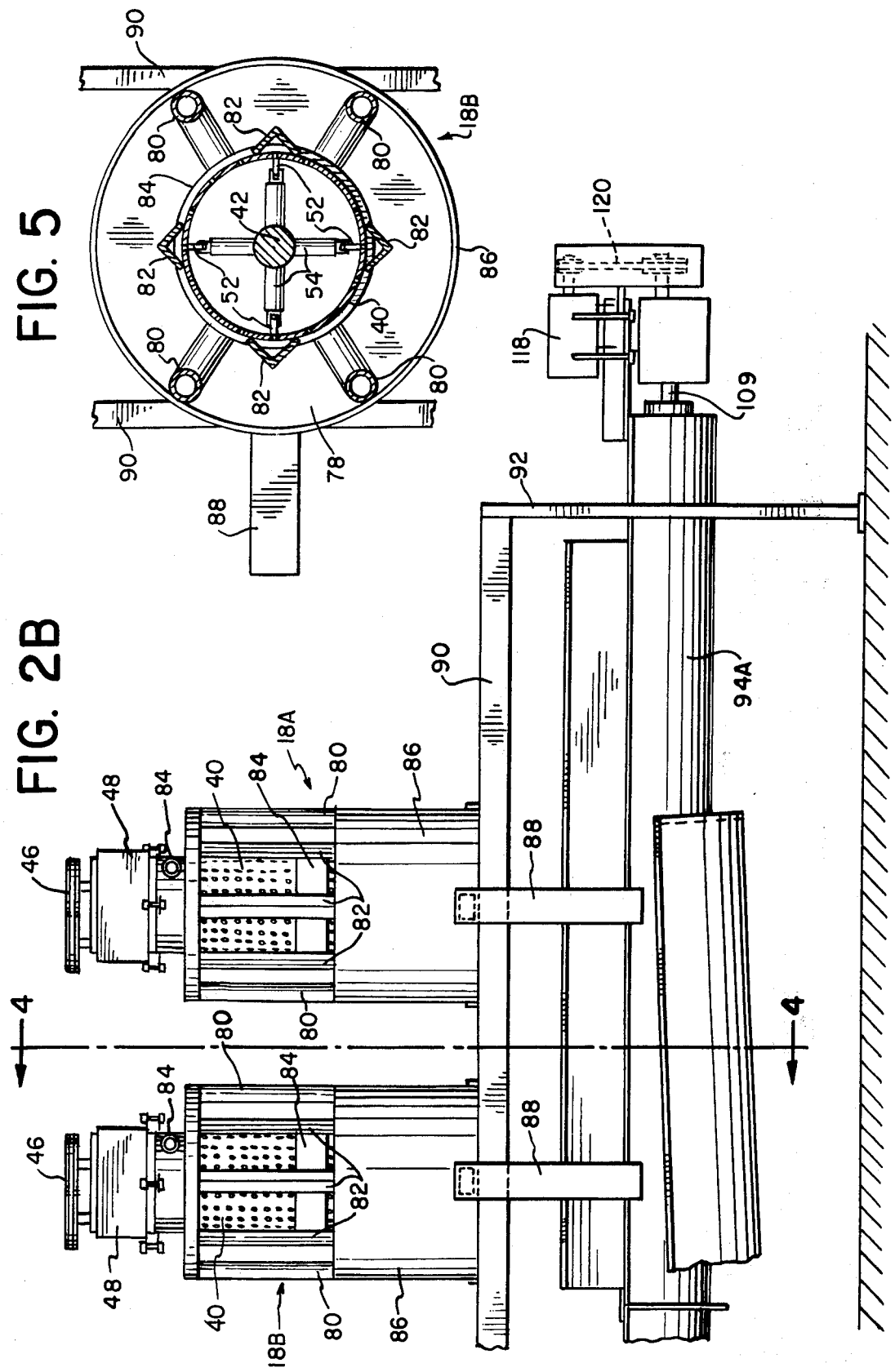
FIG. 3 is a sectional view along the line 3—3 of FIG. 2A.
Figure 4:
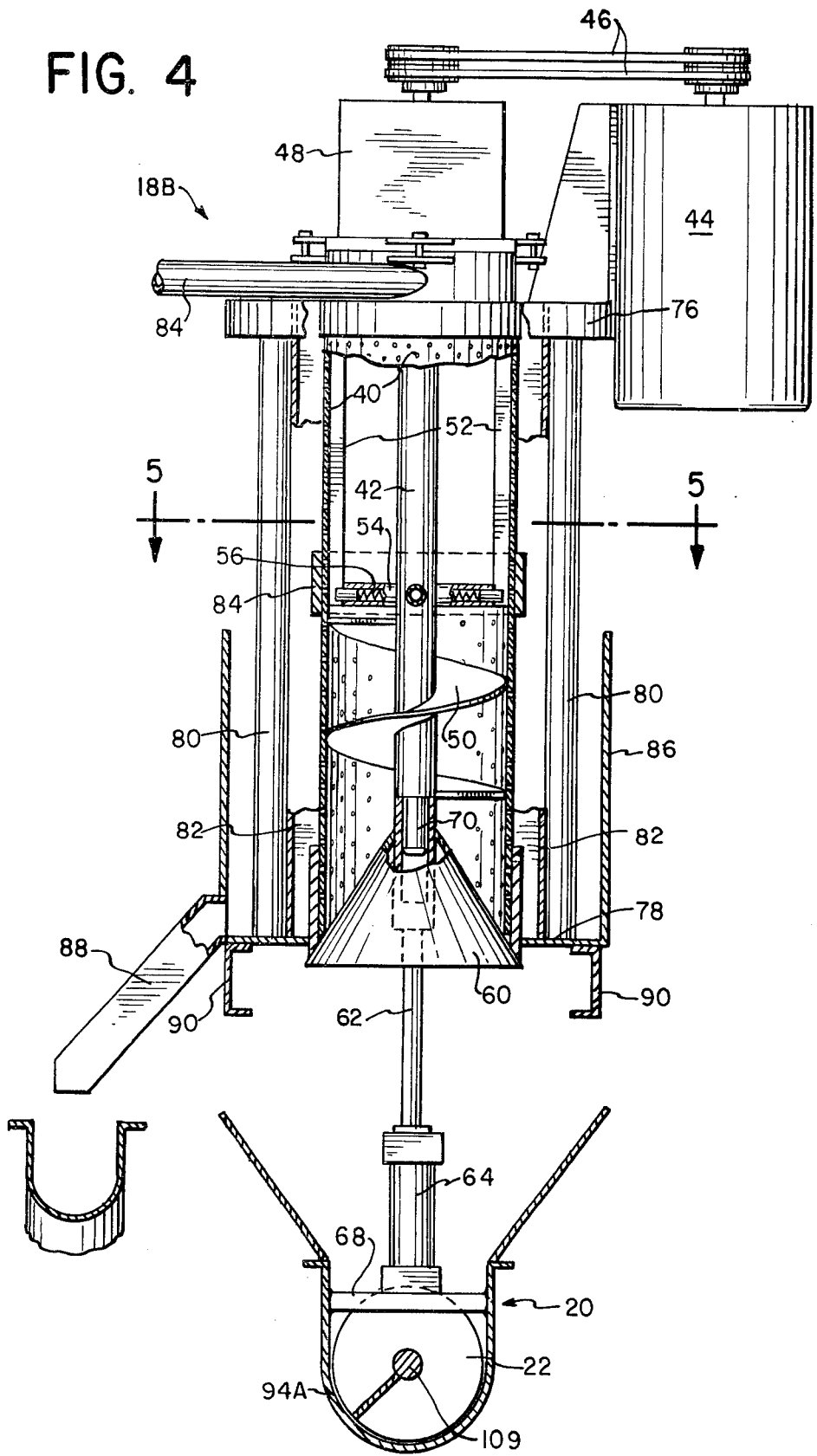
FIG. 4 is a sectional view along the line 4—4 of FIG. 2B.

The support for the nozzles is shown most clearly in FIG. 3. It comprises a horizontal brace 110 across the deflecting plates 96 above the trough washing section 94B. A vertical brace 112 extends upwardly supporting a horizontal water pipe 116 from which the nozzles 24 extend downwardly. Water is fed to the horizontal pipe 116 through a vertical inlet pipe 114 from any suitable source.

In operation, the viscous manure slurry is fed under high pressure (e.g. about 35–40 psi for a slurry with a seventy percent moisture content) through the high pressure inlet 84 into the cylindrical screen 40. The tangential feed is important since it equalizes separation as described below around the periphery of the screen. The screen 40 may be 1/16 inch thick mild steel with holes 5/64 inch in diameter. Preferably the screen holes define horizontal "rings" perpendicular to the axis of rotation. This will cause the rotating knives 52 to become serrated during use which improves their cleaning action since the serrations will more readily unplug any filled holes.

The size of the holes in screen 40 determines the contents of the silage component and (if the separator is used with a manure slurry) will be selected depending in part on the type of feed fed to the animals. Where ground grains are fed, the screen openings will ordinarily be in the order of about 5/64 inches in diameter.

The high pressure of the incoming slurry forces the liquid fraction through the holes of screen 40. However, the solid fraction within the screen tends to plug the holes. The rotating knives 52 continuously clean these holes so that the separating process can continue with the liquid fraction flowing through the screen.

Most of the separation between the liquid and solid fractions takes place in the volume occupied by the four spring-loaded knives. As the liquid is removed by the separator, the solid fraction including the fibers and grains becomes more concentrated. This increased concentration of fibers and grains is forced down into the auger 50. In the auger section, the holes of the screen 40 tend to clog creating a friction surface which helps to bind the grains and fiber material in this section. This permits the auger 50 to function as a screw press.

The pressure applied to the solid fraction is determined by the back pressure applied to the discharge cone 60. It is important that the fibers and grain in the manure slurry build up a "seal" around the periphery of discharge cone 60. If the high pressure on the inlet side cause the seal to "blow out", the liquid fraction will fall through the end of the screen resulting in inadequate separation. In experiments, satisfactory results have been achieved by applying a force of about 700 pounds to discharge cone 60.

In the preferred operation the knives 52 have a peripheral velocity of about 8–10 ft/sec. If the knives move too quickly they tend to pass over the material in the holes and fail to clean the screen. If the speed is too low the capacity is cut. The separator has been optimized for moisture contents down to 70 percent.

The liquid fraction squeezed through screens 40 of the separators is directed by channel 89 and suitable pumping means (if necessary) to vibrating screen 30 or the holding tank 32 for extraction of the protein.

The solid fraction is forced slowly through screen 40 around the periphery of cone 60 so as to maintain the required back pressure. This fraction drops into trough 20 where it is conveyed by auger 22 beneath nozzles 24 to press 26. Discharge cone 104 applies the force (e.g. in the order of 700 pounds) to compress the cleansed soilage component which, after it is forced past the cone 104, drops onto a conveyor (not shown) for removal.

What is claimed is:

1. A separator for separating a viscous slurry of at least about fifteen percent solid content into solid and liquid fractions, the liquid fraction comprising a slurry of water and fine solids and the solid fraction comprising coarse fibers and grains, including
   a housing comprising a substantially cylindrical screen having an upper zone and a lower zone, the screen having openings smaller than the fibers and grains comprising the solid fraction;
   rotatably mounted axle means extending longitudinally through the upper and lower zones;
   first inlet means communicating with said upper zone for feeding said slurry under pressure into said upper zone;
   a plurality of scraper knives mounted to the axle means in said upper zone;
   means for rotating said axle means;
   the apertures in the screen in said upper zone comprising a first outlet means for most of said liquid fraction;
   second inlet means communicating with the upper end of said lower zone for feeding said solid fraction and the remaining liquid fraction from said upper zone to said lower zone;
   a substantially helical auger flighting mounted to the axle means in said lower zone;
   second outlet means communicating with the lower end of said lower zone for discharging the contents of said lower zone, said second outlet means comprising a conically shaped member coaxial with said screen and movable axially during operation of the separator, with the small diameter end of said conical member extending into said lower zone;
   means for applying a predetermined force to said conically shaped member to provide a back pressure to the contents of said lower zone; and
   means enveloping at least a portion of said lower zone for accumulating said liquid fraction exiting from the upper and lower zones;
   whereby upon feeding said viscous slurry into said housing upper portion through said first inlet means, the majority of the liquid fraction is separated from the remainder of said slurry, said liquid fraction exiting into said said accumulating means through said first outlet means, the remainder of said slurry entering said housing lower portion via said second inlet means wherein it is compressed and discharged.

2. Separating apparatus according to claim 1, including means for rotating said scraper knives with a peripheral velocity of at least eight feet per second.

3. A separator according to claim 1, further including means for spring-biasing said scraper knives against the interior surface of said cylindrical screen.

4. Separating apparatus according to claim 1, wherein said first inlet means comprises a pipe tangentially connected to said cylindrical screen.

5. Separating apparatus according to claim 1, wherein said screen comprises a metal cylinder having a multiplicity of small holes, said holes defining a plurality of planes transverse to said axle means.

6. Separating apparatus according to claim 1, wherein said first inlet means comprises a pipe tangentially positioned with respect to said cylindrical screen.

7. Separating apparatus according to claim 6, wherein said screen comprises a metal cylinder having a multiplicity of small holes, said holes defining a plurality of planes transverse to said axle.

* * * * *